June 12, 1945.  H. C. STAEHLE ET AL  2,378,252
PROJECTION SCREEN
Filed June 30, 1942
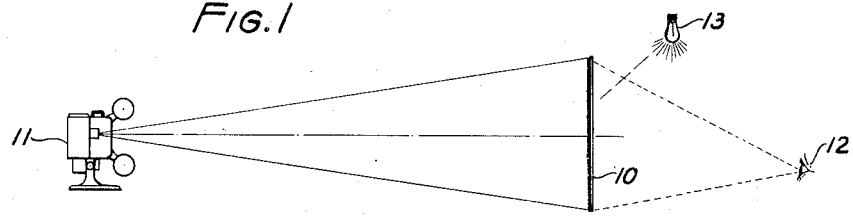
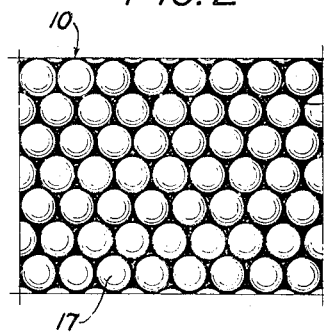
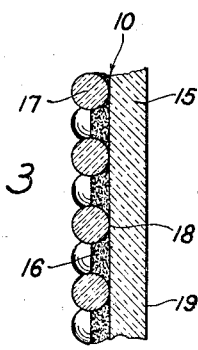
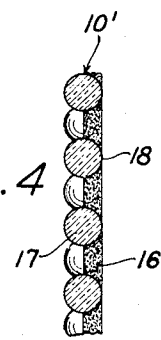
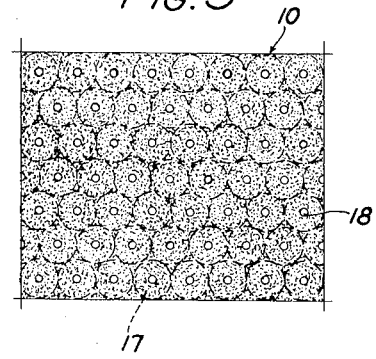
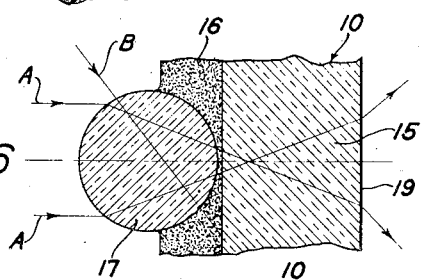
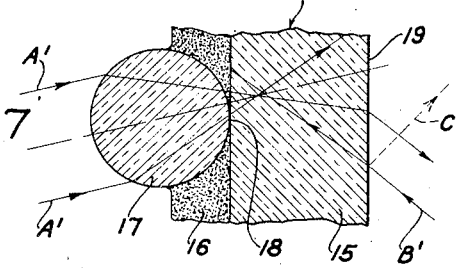
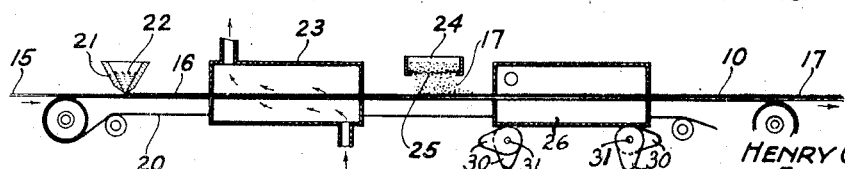
HENRY C. STAEHLE
EDWIN E. JELLEY
DAVID E. BENNETT JR.
INVENTORS
BY
ATTORNEYS Patented June 12, 1945

2,378,252

UNITED STATES PATENT OFFICE 2,378,252

PROJECTION SCREEN

Henry C. Staehle, Edwin E. Jelley, and David E. Bennett, Jr., Rochester, N. Y., assignors to Eastman Kodak Company, Rochester, N. Y., a corporation of New Jersey Application June 30, 1942, Serial No. 449,048

16 Claims. (Cl. 88—28.93)

The present invention relates to projection screens and more particularly to the type known as transmission or rear projection screens.

In rear projection screens, the diffusing screen is located between the projector and the audience. The function of such a screen is to transmit as much of the light reaching it as possible and at the same time to diffuse the light throughout a large angle. Heretofore, screens of this type have been proposed which were made up of, or embossed with, a large number of small lenticulations. Due to the minuteness of these lenses, which is necessary to obtain good resolving power at the normal viewing distance, difficulty is encountered in making a tool or die that will give the desired size and maintain a smooth surface to prevent scintillation and scattering. Further, the lenses must have a large relative aperture in order to give sufficient light spread and there must be a minimum of waste space between them in order to maintain high transmission.

In the present invention, the difficulty encountered in making a tool or die for embossing the image receiving surface of the screen is eliminated by providing a lenticulated surface made up of numerous spherical beads. As is well known in the art of rear view projection screens, a light absorbing layer is used to give the screen a black or darkened effect for use in daylight projection and is provided with exit pupils at the foci of the elements so that only the light from the projector reaches the audience. The light absorbing layer is usually a light sensitive material which when applied to the screen support and exposed to a light source, which occupies the same relative position as the projector, upon development has exit pupils at the foci of each element. These steps are eliminated in the present screen by employing a light absorbing layer that holds the beads in place and at the same time pulls them down against a transparent support to provide the exit pupil. With the use of such a light absorbing layer the screen presents a very black appearance to the audience under all conditions of illumination.

The primary object of the invention is to utilize a light absorbing layer as a masking means which permits only light from the projector to pass therethrough.

Another object is to utilize the light absorbing layer as a means for holding the light refracting medium in position.

And yet another object is to provide a screen having a lenticulated surface formed by numerous individual beads or spherules.

A further object is to provide a screen which appears black to the audience irrespective of the viewing position, and which will render possible the projection of pictures in a highly lighted room.

Further objects and advantages will be suggested to those skilled in the art by the description which follows.

The above and other objects are embodied in a projection screen in which a light absorbing layer, adjacent a transparent support, has imbedded therein, numerous refracting particles. The refracting particles or bodies extend into the light absorbing layer and are substantially in contact with the support so as to provide exit pupils in the layer for the refracted light from the projector.

Reference is hereby made to the accompanying drawing wherein like reference numerals and characters designate similar parts and wherein:

Fig. 1 is a diagrammatic view showing the position of the screen with respect to the projector and the observer;

Fig. 2 is an enlarged elevation view of the image receiving surface of a portion of the screen;

Fig. 3 is an enlarged partial section through the screen;

Fig. 4 is an enlarged partial section through a screen similar to that shown in Fig. 3, but stripped from its support;

Fig. 5 is a front elevation of a portion of the screen shown in Fig. 4 showing the small translucent areas formed by the spherules in the light absorbing layer;

Fig. 6 is an enlarged view of one of the spherules, which is not in contact with the support, showing the path of the light therethrough;

Fig. 7 is an enlarged view of one of the spherules, which is in contact with support, showing the path of the light therethrough when received at an angle to the horizontal; and Fig. 8 is a diagrammatic view showing a method of producing the screen hereinafter described.

Projection screens composed of spherical elements or bodies of glass or other transparent mediums applied to an adhesive layer on a support are well known to those skilled in the art. However, screens utilizing such spherules or beads are of the reflecting rather than the transmission type and, hence, do not appear black to the audience or observer. The reflection type of screen cannot be readily adapted to daylight use because of the bright appearance to the eye. Therefore, the use of a transparent support with a light absorbing layer supporting light refracting bodies in contact with the support provides a screen that fulfills all the requirements necessary for a screen that may be used as either a daylight or darkroom projection screen.

As shown in Fig. 1, the screen 10 is located between the projector 11 and the audience or observer indicated by the eye 12. The plane surface of the screen 10 faces the audience, and the rough or beaded surface faces the projector 11. The extraneous light falling on the screen is indicated by the lamp 13.

The screen 10 comprises a transparent support 15 to which is applied a light absorbing layer 16 through which the spherules 17 extend. The spherules 17 are substantially in contact with the support 15, and at the point of contact form small areas 18, as shown in Fig. 5, through which the refracted light, as hereinafter described, passes.

The transparent support 15 while shown in the accompanying drawing as a glass sheet may be of any other suitable transparent material. The support may be, for example, made from sheet film. The sheet film may be treated with plasticizers to produce a flexible roll-type screen, or may be used without a plasticizer to produce a flat screen.

The light absorbing layer 16 applied to the support 15 may consist of a thermoplastic material or gelatin containing a dye which absorbs the visible light more or less uniformly. Alternatives that may be used are developed and fixed photographic emulsion, dopes or lacquers containing black dyes or pigments, and dark colored varnishes such as Brunswick black and asphalt varnish. It has been found, however, that a thermoplastic layer is preferable because with the other materials, upon drying, a shrinkage away from the area between the spheres allows considerable transmission of light through the layer, rather than through the spheres, and hence the contrast of the resultant image is reduced. One condition imposed on the light absorbing substance is that it should not dissolve or otherwise change the shape of the spherules. In place of a black dye, a blue dye could be used to compensate for the color of the light source.

The light refracting bodies or spherules 17 must be transparent and either colorless or have a color to provide some special effect for show or display purpose. In particular, they could be colored blue in order to compensate for the yellowish light of the projector. The spherules 16 may be made of any refractive material, such as glass or a resin, synthetic or natural. Particularly suitable resins are the polyalkyl methacrylates, isobutyl methacrylate and polystyrenes. The most satisfactory index of refraction was found to be 1.6 with limiting indices of 1.45 and 1.75. Outside of these limits the light transmitting power of a projection screen as above described would be reduced considerably. The spherules may be of uniform size or may have a wide range of sizes, the fineness of the spherules governing the resolving power of the screen.

It might be emphasized at this point that daylight projection screens require at least twenty times as much light as is needed for projection in a darkened room. This is due mainly to retinal adaptation and due to some extent to the difference in the diameter of the pupil in a brightly lighted room compared with a darkened one. Some improvement with respect to retinal adaptation can be obtained by having a wide black border around the edge of the screen.

The thickness of the support 15 will vary in accordance with the size of the screen, as will the diameter of the spherules 17. With a large screen, the light absorbing layer 16 and the spherules 17 may be stripped from the support 15 to provide a screen 10' as shown in Fig. 4. This form of the screen may be produced in the same manner as the preferred embodiment, shown in Fig. 3, described hereinafter. The light absorbing layer, however, should have incorporated therein a plasticizer in order to remove the brittleness and to permit rolling up of the screen.

The screen 10 may be produced by the apparatus as shown in Fig. 8. The support 15 is placed upon the endless belt 20 and passes under the hopper 21 containing the light absorbing medium 22. A layer of said light absorbing medium is coated onto the support 15 and passes into a drying chamber 23 where the solvents are evaporated forming a thermoplastic film. After drying, the support 15 and the light absorbing layer 16 passes under a box 24 containing the spherules 17. The box 24 may be shaken in any well known manner to cause the spherules to fall through the mesh screen 25 onto the light absorbing layer 16. On passing through the heating chamber 26, the layer 16 is melted or softened whereby the spherules 17 settle by gravity into contact with or to become adjacent the support 10. To insure that all the spherules are in contact, a pressure roller may be mounted in the cabinet 26, and it has been found that vibration or agitation of the screen, i. e., the support and the light absorbing layer or the spherules while in the chamber 26 insures close packing of the spherules. Vibration or agitation of the screen may be accomplished by a set of cams 30 which may be set with the high points approximately 90° apart so that the screen is given a "weaving" motion whereby the spherules will not pile up on one another but roll into the light absorbing layer. The frequency of vibration, of course, will depend on the R. P. M. of the shafts 31 which may be driven in any suitable manner. Vibration or agitation of the spherules may be accomplished by an air jet directed on the spherules or a doctor blade which may be mounted transversely of the screen thereby wiping off the excess spherules and allowing a substantially single layer of spherules to contact the light absorbing layer. Upon leaving the chamber 26 the layer 16 hardens when exposed to the air and securely grips and holds the spherules 17 in contact with or closely adjacent to the support 15. After the light absorbing layer 16 has hardened, the excess beads may be brushed off and the sheet cut into the proper screen size. The layer 16 and the spherules 17 may be stripped from the support 15 after leaving the chamber 26 to form a screen as shown in Fig. 4.

If the spherules 17 have a refractive index of approximately 1.5 and are in contact with a transparent support of the same refractive index, as shown in Fig. 3, the pencil of rays will travel through the area 18 and the absorbing layer 16 surrounding the area 18 which is so thin that the degree of absorption is very low. If the refractive index were 1.4, the size of the disc through which the rays would emerge would be considerably higher. If the refractive index were very high, for example, 2, a very large proportion of the rays would suffer total internal reflection, as the angle they would make with the surface 19 would exceed the critical angle. However, the rays striking the edge of the spherules will suffer internal reflection irrespective of the refractive index.

A screen made in accordance with the above description can be made very inexpensively and may be used for either darkroom or daylight projection. The layer 16, with the exception of the translucent areas, presents a black or dark appearance to the observer with a minimum of surface reflection due to extraneous light.

In Fig. 6 the spherule 17 is not in intimate contact with the surface of the support 15, but the thickness of the light absorbing layer 16 is so thin that substantially all the light, as designated by A, will be refracted into the support 15. Any extraneous light as designated by B, after passing through the spherules 17 will be absorbed by the layer 16 and will not reach the observer on the other side of the screen. It is well known that light on passing through a spherical medium does not come to a definite focus because of the spherical aberration. However, the size of the spherules is so small, from .003 mm. to several millimeters depending on the size of the screen, that substantially all the light incident thereon will be refracted through the area 18 to the support 15 or will be permitted to reach the support through the relatively thin section of the layer 16 surrounding the area 18.

In Fig. 7, the spherule 17 is in intimate contact with the support and receives the light at an angle to the horizontal due to its being near the edge of the screen. In this case, a portion of the light, as designated by A', will pass through the area 18, and a portion will pass through the thin portion of the layer surrounding the area 18. The extraneous light, as designated by B', incident on the viewing side of the screen will pass through the support 15, with some surface reflection as shown by the dotted line C, and be absorbed by the layer 16.

The following example sets forth a specific composition of the light absorbing layer and the method of making the screen. The light absorbing layer may comprise:

Polyvinyl acetate (Gelva V-2.5 from the
  Shawinigan Chem. Corp.) _____gms__ 5.0
Triethylene glycol di-2-ethyl butyrate__cc__ 0.5
Monoethyl ether of ethylene glycol_____cc__ 5.0
Methanol_____cc__ 12.5
Spirit black T (from the General Dyestuff
  Corp.) _____gm__ 0.3

This solution is coated on the support 10 so that the thickness when dry is about .001 inch and the optical density approximately 2.0.

After drying, the surface is covered with spheres of polymeric methyl methacrylate about .004 inch in diameter. The support and layer is then heated to 100° C. for approximately one minute, while vibrating or agitating the screen to settle the spheres. At the end of this period, the spheres have settled into contact with the support by gravity or by means of a pressing roll, and the screen is allowed to cool, whereupon the thermoplastic layer sets.

Having now particularly described our invention, what we desire to secure by Letters Patent of the United States and what we claim is:

1. A screen for viewing projected images and reducing the effect of extraneous light comprising a light transmitting support having two opposed surfaces, one of which is a front surface, a single light absorbing layer on the other surface of said support, and a plurality of refracting spherules extending into said layer to provide apertures therein and for directing light from the rear and directly incident upon said spherules through said apertures and said light transmitting support and said front surface.

2. A screen for viewing projected images and reducing the effect of extraneous light comprising a transparent support having an image receiving surface, a single light absorbing layer adjacent the image receiving surface of said support, and a single layer of transparent spherules extending into and supported by said layer and substantially in contact with said support to provide apertures in said layer and through which apertures is projected light incident upon said transparent spherules, the dimension and index of refraction of said spherules causing the projected light to be focused substantially at said image receiving surface.

3. A screen for viewing projected images and reducing the effect of extraneous light comprising a transparent support having an image receiving surface, a single light absorbing layer adjacent the image receiving surface of said support, and a single layer of transparent spherules of polymeric methyl methacrylate extending into and supported by said layer and substantially in contact with said support to provide apertures in said layer and through which apertures is projected light incident upon said spherules, the dimension and index of refraction of said spherules causing the projected light to be focused substantially at said image receiving surface.

4. A screen for viewing projected images and reducing the effect of extraneous light comprising a transparent support having an image receiving surface, a single light absorbing layer adjacent the image receiving surface of said support, and a single layer of transparent resinous spherules extending into and supported by said layer and substantially in contact with said support to provide apertures in said layer and through which apertures is projected light incident upon transparent spherules, the dimension and index of refraction of said spherules causing the projected light to be focused substantially at said image receiving surface.

5. The method of producing a light transmitting projection screen which comprises applying a layer of a light absorbing and thermoplastic film forming dope to a support, drying said dope to form a thermoplastic film, applying to said film light refracting bodies having a dimension greater than the thickness of said film and having a melting point higher than that of said film, heating said film to melt the same so that said bodies settle into substantial contact with the surface of said support thereby forming light transmitting areas in said layer, and stripping said layer from said support.

6. The method of producing a light transmitting projection screen which comprises applying a layer of a light absorbing and thermoplastic film forming dope to a support, drying said dope to form a thermoplastic film, applying to said film light transmitting resinous spherules having a dimension greater than the thickness of said film and having a melting point higher than that of said film, heating said film to melt the same so that said spherules settle into substantial contact with the surface of said support thereby forming light transmitting areas in said layer, and stripping said layer from said support.

7. The method of producing a light transmitting projection screen which comprises applying a layer of a light absorbing and thermoplastic film forming dope to a support, drying said dope to form a thermoplastic film, applying to said film light transmitting polymerized alkyl methacrylate spherules having a dimension greater than the thickness of said film and having a melting point higher than that of said film, heating said film to melt the same so that said spherules settle into substantial contact with the surface of said support thereby forming light transmitting areas in said layer, and stripping said layer from said support.

8. The method of providing a light transmitting projection screen which comprises applying a layer of a light absorbing and thermoplastic film forming dope to a transparent support, drying said dope to form a thermoplastic film, applying to said film light refracting bodies having a dimension greater than the thickness of said film and having a melting point higher than that of said film, and heating said film to melt the same so that substantially all of said particles settle into substantial contact with the surface of said support thereby forming light transmitting areas in said layer.

9. The method of providing a light transmitting projection screen which comprises applying a layer of a light absorbing and thermoplastic film forming dope to a transparent support, drying said dope to form a thermoplastic film, applying to said film light transmitting resinous particles having a dimension greater than the thickness of said film and having a melting point higher than that of said film, and heating said film to melt the same so that substantially all of said particles settle into substantial contact with the surface of said support thereby forming light transmitting areas, in said layer.

10. The method of providing a light transmitting projection screen which comprises applying a layer of a light absorbing and thermoplastic film forming dope to a transparent support, drying said dope to form a thermoplastic film, applying to said film light transmitting polymerized alkyl methacrylate particles having a dimension greater than the thickness of said film and having a melting point higher than that of said film, and heating said film to melt the same so that substantially all of said particles settle into substantial contact with the surface of said support thereby forming light transmitting areas in said layer.

11. The method of providing a light transmitting projection screen which comprises applying a layer of a light absorbing and thermoplastic film forming dope to a transparent support, drying said dope to form a thermoplastic film, applying to said film light transmitting resinous particles having a dimension greater than the thickness of said film and having a melting point higher than that of said film, heating said film to melt the same, and vibrating said screen so that substantially all of said particles form a single layer and settle into substantial contact with the surface of said support thereby forming light transmitting areas in said layer.

12. The method of providing a light transmitting projection screen which comprises applying a layer of a light absorbing and thermoplastic film forming dope to a transparent support, drying said dope to form a thermoplastic film, applying to said film light transmitting polymerized alkyl methacrylate particles having a dimension greater than the thickness of said film and having a melting point higher than that of said film, heating said film to melt the same, and vibrating said screen so that said particles form a single layer and substantially all of said particles settle into substantial contact with the surface of said support thereby forming light transmitting areas in said layer.

13. A rear view projection screen comprising a light absorbing layer having a rear surface for receiving a projected image beam and having an opposed viewed front surface which may receive extraneous light, and a plurality of refracting spherules extending into said rear surface and through said light absorbing layer to provide viewing apertures in said front surface and having rear exposed surfaces, the projected image beam being incident upon said rear surfaces of the spherules and being projected thereby forwardly only through said viewing apertures while the extraneous light incident upon said front surface is absorbed by the unapertured portion of said layer.

14. A rear view projection screen comprising a light absorbing layer having a rear surface for receiving a projected image beam and having an opposed viewed front surface which may receive extraneous light, and a plurality of refracting spherules extending into said rear surface and through said light absorbing layer to provide viewing apertures, receiving the major portion of said image beam and directing it forwardly only through said viewing apertures, the unapertured portion of said front surface constituting the major portion thereof and absorbing the majority of any extraneous light incident upon said front surface.

15. A rear view projection screen comprising a light transmitting support having two opposed surfaces, one of which is a front and viewed surface and which may have extraneous light incident thereon, a light absorbing layer on the other surface of said support and having a rear surface spaced therefrom, and a plurality of refracting spherules extending into said rear surface and through said light absorbing layer to provide viewing apertures in the surface thereof adjacent said support, having rear exposed faces upon which an image beam is projected, and having their foci respectively in alignment with said viewing apertures and within said light transmitting support.

16. A rear view projection screen comprising a light transmitting support having two opposed surfaces, one of which is a front and viewed surface and which may have extraneous light incident thereon, a light absorbing layer on the other surface of said support and having a rear surface spaced therefrom, and a plurality of refracting spherules extending into said rear surface and through said light absorbing layer to provide viewing apertures in the surface thereof adjacent said support, having rear exposed faces upon which an image beam is projected, and projecting said image beam forwardly only and through said viewing apertures, the extraneous light incident upon said light transmitting support being absorbed by the unapertured area of said light absorbing layer.

HENRY C. STAEHLE.
EDWIN E. JELLEY.
DAVID E. BENNETT, Jr.